(No Model.)
J. WALKER, Jr.
LUBRICATOR.
No. 289,477. Patented Dec. 4, 1883.
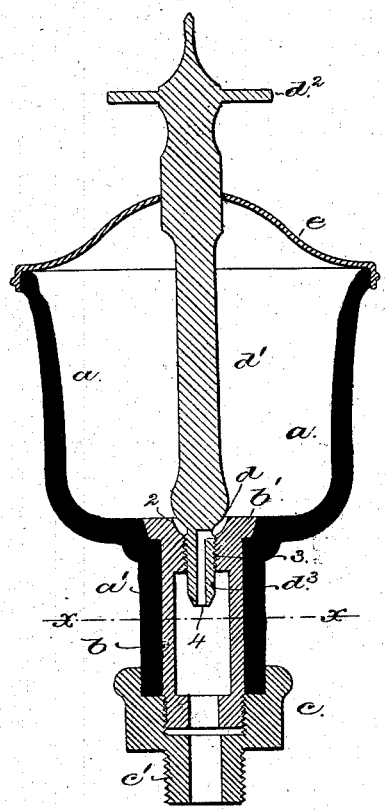
Witnesses.
John F. C. Prinkert
B. J. Noyes.
Inventor.
James Walker Jr.
by Crosby & Gregory attys.

UNITED STATES PATENT OFFICE.

JAMES WALKER, JR., CHELSEA, MASSACHUSETTS.

LUBRICATOR.

SPECIFICATION forming part of Letters Patent No. 289,477, dated December 4, 1883.

Application filed October 1, 1883. (No model.)

*To all whom it may concern:*

Be it known that I, JAMES WALKER, Jr., of Chelsea, county of Suffolk, State of Massachusetts, have invented an Improvement in Lubricators, of which the following description in connection with the accompanying drawings is a specification, like letters on the drawings representing like parts.

My invention relates to a lubricator of that class in which the oil or lubricant passes from the oil-reservoir, drop by drop, through a sight-opening, thus permitting the rapidity of flow to be observed. The flow to the dropping-passage is controlled by a valve which, in the present invention, has a portion of its stem screw-threaded to engage a threaded socket below the valve-seat, and the said threaded portion is made tubular or provided with a passage, and constitutes the delivery-nozzle from which the oil is permitted to drop.

Figure 1 is a vertical longitudinal section of a lubricator embodying this invention, and Fig. 2 is a horizontal section on line $x\ x$, Fig. 1.

The reservoir or body $a$ of the lubricator, made of glass to permit its contents to be seen from the outside, is provided at its lower end with a tubular extension, $a'$, made as an integral part thereof, within which is placed a metallic bushing or thimble, $b$, shown in this instance as threaded at its lower end to receive a nut, $c$, which is recessed at its upper end to receive the extension $a'$ of the reservoir, and is provided with a threaded projection, $c'$, by which it may be attached to the part to be lubricated. The bushing $b$ is provided at its upper end with a flange, $b'$, which engages the lower end of the reservoir $a$, the extension $a'$ of which is thus securely clamped between the nut $c$ and flange $b'$, and supported firmly on the said nut. Suitable packing or cement is used between the reservoir $a$ and bushing $b$ to make a tight joint between them. The bushing $b$ has at its upper end a valve-seat, 2, and below it a threaded socket, 3, and the flow of liquid over the said valve-seat is controlled by a valve, $d$, provided with a stem or handle, $d'$, passing upward through the reservoir $a$, and provided at its top with a suitable head, $d^2$, to enable it to be rotated by the operator. The valve-stem is continued below the valve, as shown at $d^3$, the said extension being threaded to correspond with the threads of the passage 3 in the bushing $b$, so that by rotating the valve-stem the valve $d$ will be raised and lowered to permit a greater or less amount of liquid to pass from the reservoir. The extension $d^3$ of the valve-stem is provided with a passage, 4, communicating with the space between the valve and its seat, and forming the delivery-passage for the liquid escaping from the reservoir. The extension $d^3$ is made tapering at its outside, so that any liquid that may escape between the screw-threads at 3 will run down to the point of the said extension and unite with the oil passing through the passage 4 to form drops, so that the liquid will be delivered drop by drop. The bushing $b$ has large openings in its sides, as best shown in Fig. 2, to permit the dropping of the oil to be observed, so that the flow may be regulated by the valve to the desired amount. The tubular extension $a'$ forms a transparent cover for the openings in the bushing $b$, preventing the entrance of dust to the passage in the said nipple.

The reservoir $a$ is provided with a cover, $e$, which is free to move up and down on the stem $d'$ for filling the reservoir $a$. By having the threaded portion of the valve-stem operate in a socket at the lower end of the reservoir $a$ the construction of the lubricator is greatly simplified, as it is not necessary to have the cover $e$ rigidly connected with the lower portion of the lubricator containing the valve-seat, as is the case when the threads for operating the valve are on the upper portion of the valve-stem, and work in a socket in the cap or cover of the reservoir.

By making the nozzle $d^3$ as a portion of the valve-stem it is easy to finish it to the proper taper to cause the drops to form readily and uniformly.

I claim—

1. The transparent reservoir provided with a transparent tubular extension made as an integral part of said reservoir, combined with the internal bushing having openings in its sides, and the nut screwed upon the said bushing, and engaging the said extension of the reservoir, substantially as described.

2. The reservoir and bushing secured thereto having sight-openings provided with a valve-seat and threaded socket, combined with the valve and valve-stem, having a threaded extension below the valve, and a delivery-passage at the end of the said stem constituting a tapering nozzle, substantially as and for the purpose described.

3. In a lubricator, the transparent reservoir having a transparent extension made as an integral part thereof, combined with the internal thimble secured within the said reservoir, and provided with a valve-seat above the said extension, and co-operating valve controlling the discharge of oil from the said reservoir, and the discharging nozzle or nipple within the transparent extension of the reservoir, substantially as described.

In testimony whereof I have signed my name to this specification in the presence of two subscribing witnesses.

JAMES WALKER, JR.

Witnesses:
   JOS. P. LIVERMORE,
   W. H. SIGSTON.